US010418864B2

(12) United States Patent
Inoue

(10) Patent No.: US 10,418,864 B2
(45) Date of Patent: Sep. 17, 2019

(54) STATOR CORE

(71) Applicant: HONDA MOTOR CO., LTD., Tokyo (JP)

(72) Inventor: Masashi Inoue, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 179 days.

(21) Appl. No.: 15/458,026

(22) Filed: Mar. 14, 2017

(65) Prior Publication Data

US 2017/0264147 A1    Sep. 14, 2017

(30) Foreign Application Priority Data

Mar. 14, 2016  (JP) ................................. 2016-049158

(51) Int. Cl.
| | |
|---|---|
| *H02K 1/12* | (2006.01) |
| *H02K 1/14* | (2006.01) |
| *H02K 3/18* | (2006.01) |
| *H02K 1/16* | (2006.01) |
| *H02K 3/12* | (2006.01) |

(52) U.S. Cl.
CPC ............. *H02K 1/146* (2013.01); *H02K 1/165* (2013.01); *H02K 3/18* (2013.01); *H02K 3/12* (2013.01)

(58) Field of Classification Search
CPC .. H02K 1/14; H02K 3/18; H02K 1/16; H02K 2201/06; H02K 1/185; H02K 3/28
USPC .................... 310/216.069, 216.072
See application file for complete search history.

(56) References Cited

U.S. PATENT DOCUMENTS

| | | | |
|---|---|---|---|
| 3,886,256 A * | 5/1975 | Ohuchi | .................... H02K 1/16 |
| | | | 310/216.043 |
| 5,637,943 A * | 6/1997 | Berger | ................. H02K 17/205 |
| | | | 310/211 |
| 6,222,296 B1 | 4/2001 | Sakai et al. | |

(Continued)

FOREIGN PATENT DOCUMENTS

| | | |
|---|---|---|
| JP | 2003-324879 | 11/2003 |
| JP | 2004-248440 | 9/2004 |

(Continued)

OTHER PUBLICATIONS

Japanese Office Action for corresponding JP Application No. 2016-049158, dated Sep. 4, 2018 (w/ machine translation).

(Continued)

*Primary Examiner* — Julio C. Gonzalez
*Assistant Examiner* — Leda T Pham
(74) *Attorney, Agent, or Firm* — Mori & Ward, LLP

(57) ABSTRACT

A stator core of a rotating electric machine, includes a base, teeth, slots, and cutouts. The base includes a through-hole having a substantially cylindrical shape surrounded by an inner circumferential wall around a center axis of the substantially cylindrical shape. Teeth are arranged around the center axis and extending along a radial direction of the substantially cylindrical shape from the inner circumferential wall toward the center axis. Each of the teeth has a first end surface and a second end surface opposite to the first end surface in the center axis. Each of the slots is defined between a tooth and another tooth adjacent to the tooth among the teeth such that a coil is to be provided into each of the slots. Each of the cutouts is provided in the first end surface to face an inner surface of a bent portion of the coil.

14 Claims, 10 Drawing Sheets

(56) References Cited

U.S. PATENT DOCUMENTS

| | | | | |
|---|---|---|---|---|
| 7,049,725 B2* | 5/2006 | Blouin | ................... | H02K 1/165 310/216.012 |
| 2010/0320864 A1* | 12/2010 | Rahman | ................... | H02K 3/12 310/201 |
| 2011/0291521 A1* | 12/2011 | Kleber | ................... | H02K 1/165 310/216.069 |
| 2012/0169058 A1* | 7/2012 | Semmer | ................... | H02K 3/12 290/55 |

FOREIGN PATENT DOCUMENTS

| | | |
|---|---|---|
| JP | 2017-079557 | 4/2007 |
| JP | 2007-244069 | 9/2007 |
| JP | 2010-130842 | 6/2010 |
| JP | 2010-268586 | 11/2010 |

OTHER PUBLICATIONS

Japanese Office Action for corresponding JP Application No. 2016-049158, dated Jan. 9, 2018.

\* cited by examiner

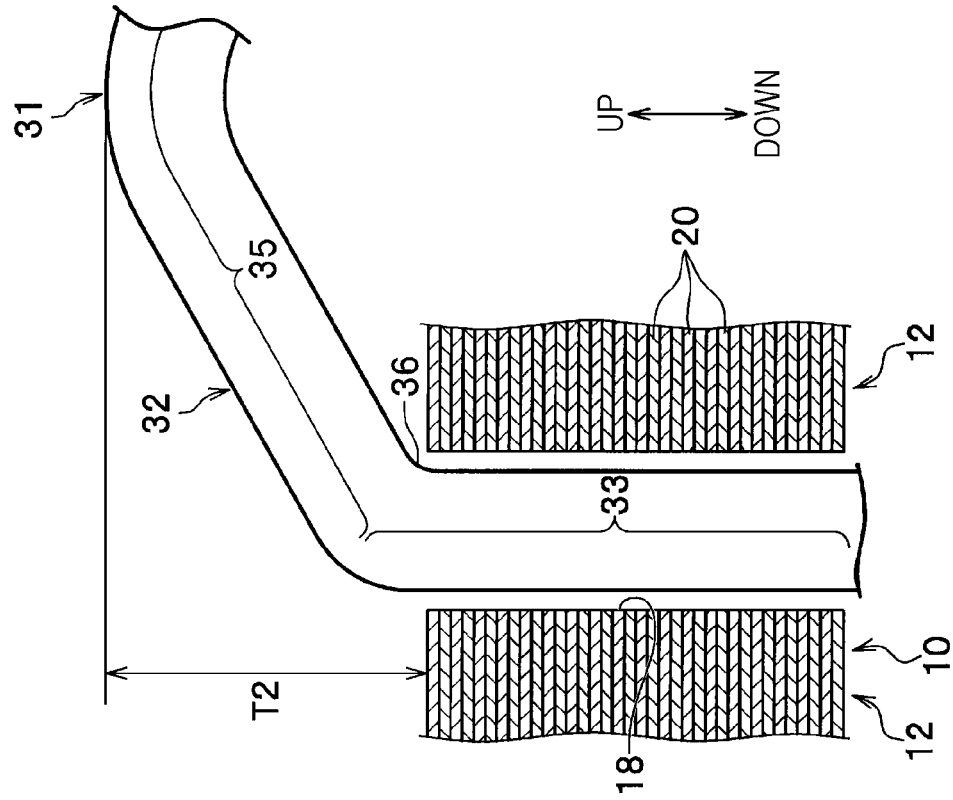
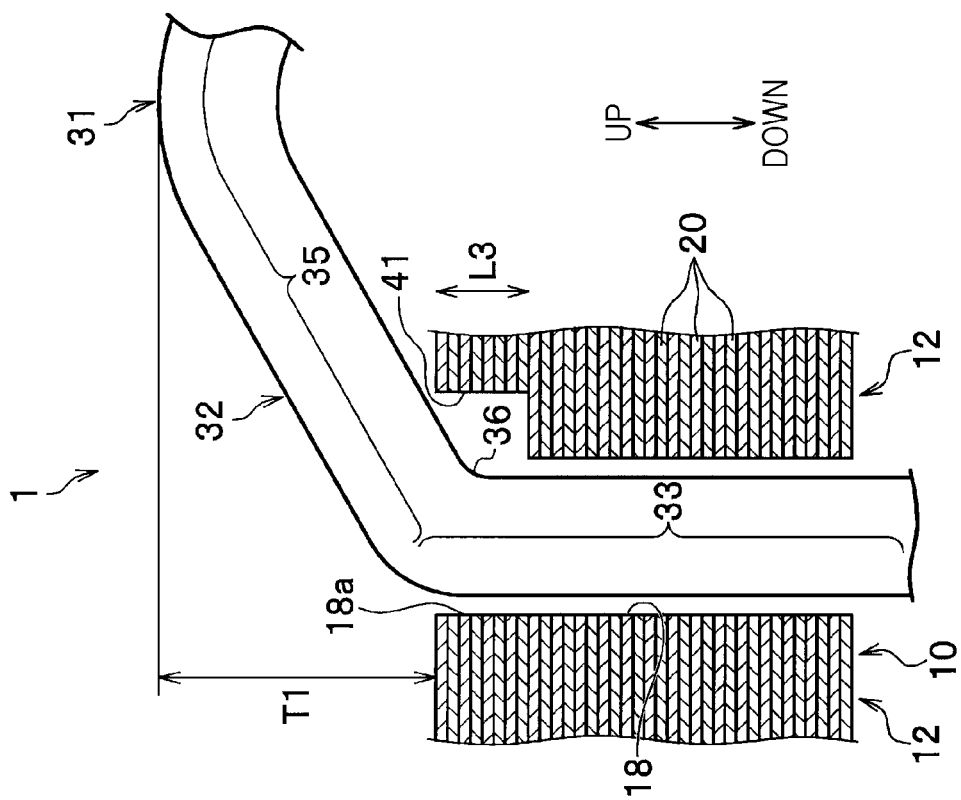

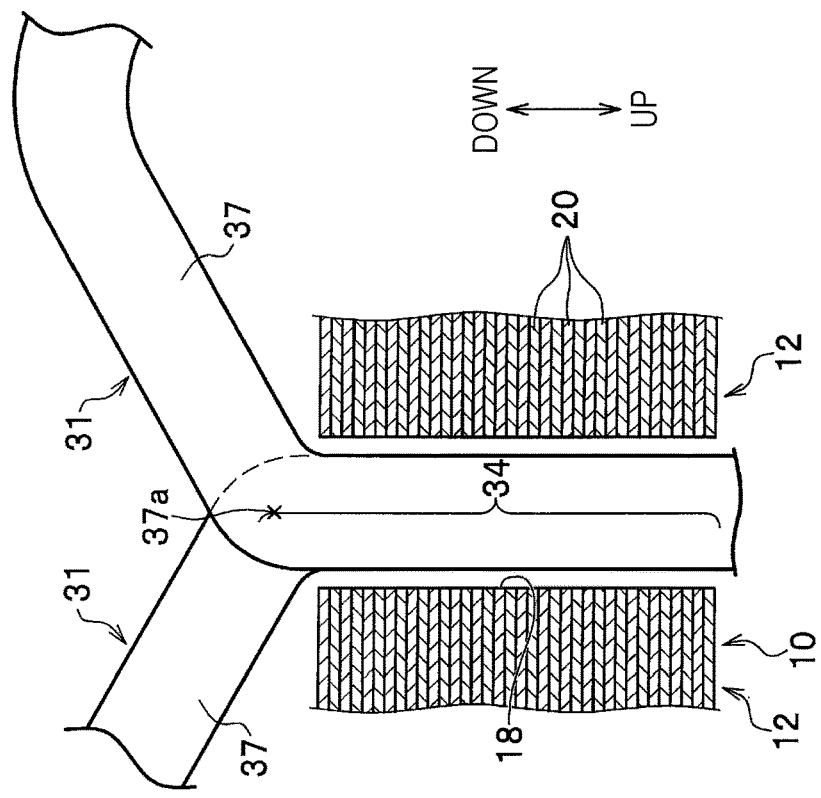
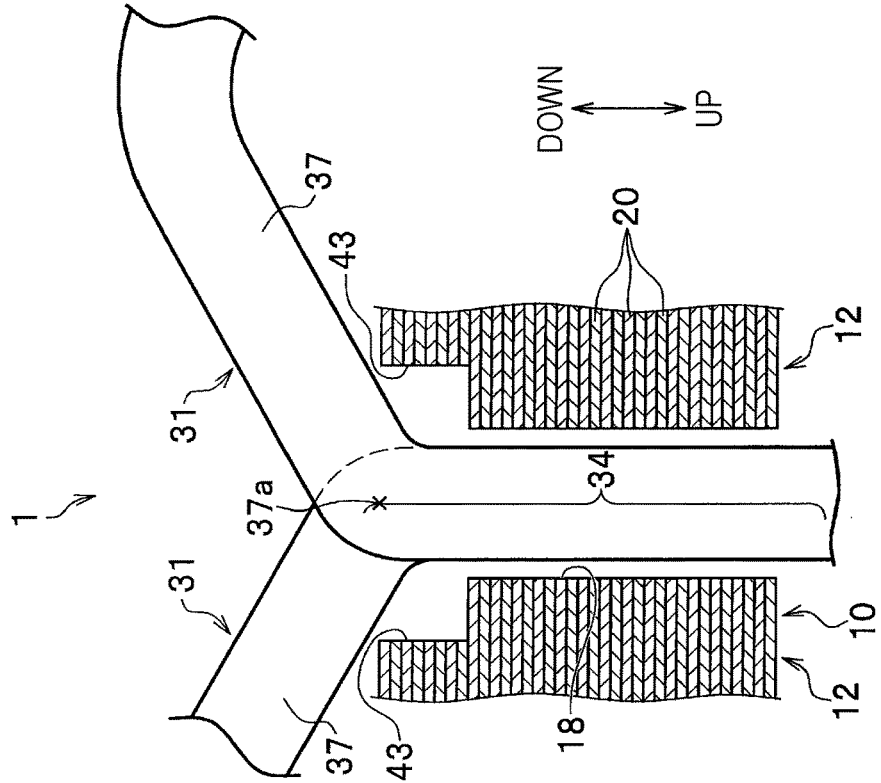

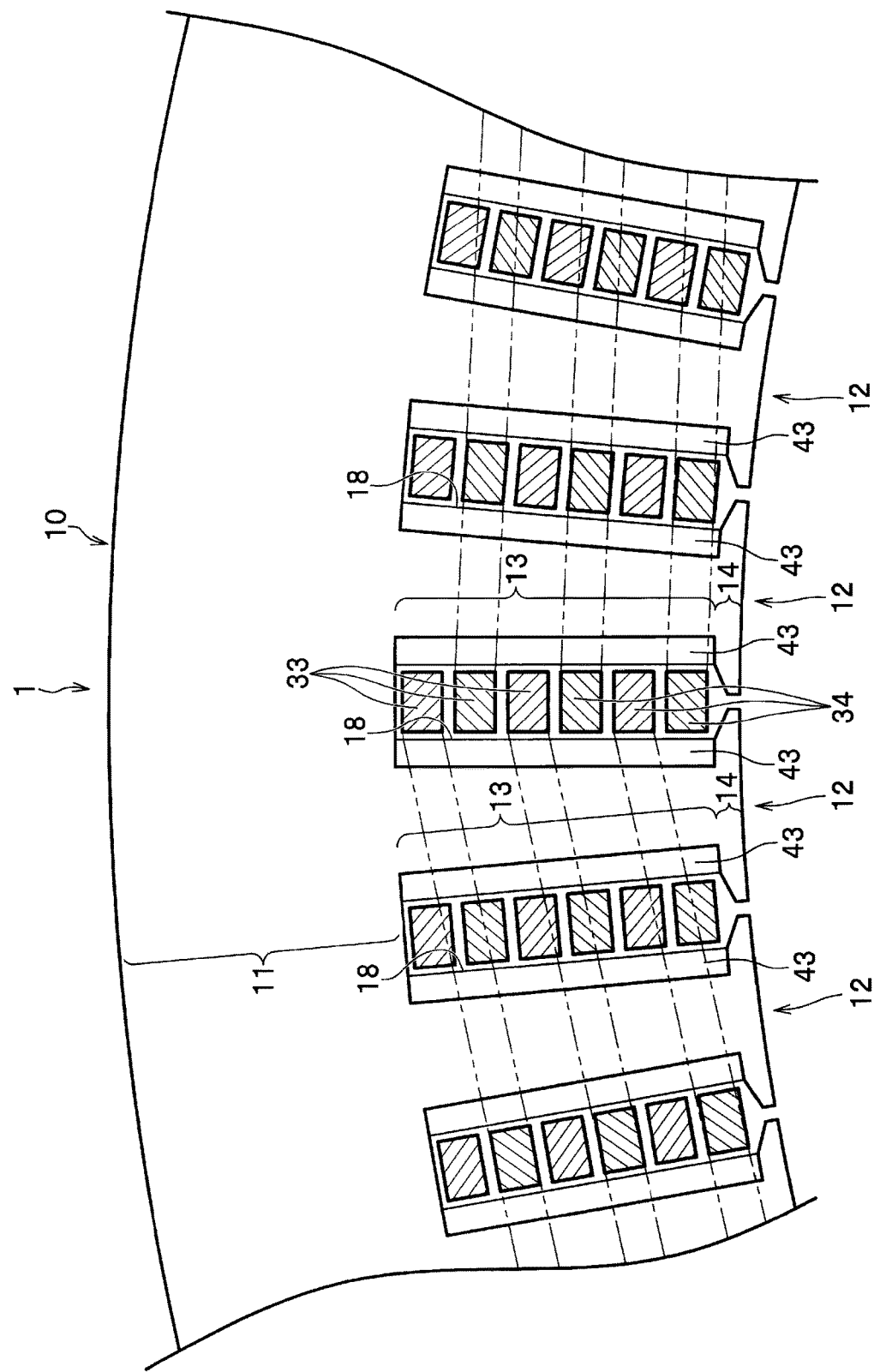

STATOR CORE

CROSS-REFERENCE TO RELATED APPLICATIONS

The present application claims priority under 35 U.S.C. § 119 to Japanese Patent Application No. 2016-049158, filed Mar. 14, 2016, entitled "Stator Core." The contents of this application are incorporated herein by reference in their entirety.

BACKGROUND

1. Field

The present disclosure relates to a stator core.

2. Description of the Related Art

Various techniques have been devised to reduce the size of a motor in the axial direction. For example, Japanese Unexamined Patent Application Publication No. 2010-130842 describes a stator core whose edge portions that surround the openings of slots have tapered surfaces so as to reduce the protruding amount by which coils protrude from a stator core outward in the axial direction. Thus, the coils are in close contact with the tapered surfaces.

SUMMARY

According to one aspect of the present invention, a stator core includes a cylindrical base portion and a plurality of teeth that extend inward in a radial direction from the cylindrical base portion and that are arranged at predetermined intervals in a circumferential direction. A slot, into which a coil is inserted, is formed between each pair of the teeth that are adjacent to each other in the circumferential direction. A cutout is formed in a part of each of the teeth near one end surface of the tooth, the part facing an inner surface of a bent portion of the coil, the cutout having a predetermined length in the circumferential direction, a predetermined length in the radial direction, and a predetermined length in an axial direction.

According to another aspect of the present invention, a stator core of a rotating electric machine, includes a base, teeth, slots, and cutouts. The base includes a through-hole having a substantially cylindrical shape surrounded by an inner circumferential wall around a center axis of the substantially cylindrical shape. Teeth are arranged around the center axis and extending along a radial direction of the substantially cylindrical shape from the inner circumferential wall toward the center axis. Each of the teeth has a first end surface and a second end surface opposite to the first end surface in the center axis. Each of the slots is defined between a tooth and another tooth adjacent to the tooth among the teeth such that a coil is to be provided into each of the slots. Each of the cutouts is provided in the first end surface to face an inner surface of a bent portion of the coil.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 4A is a sectional view of the stator according to the embodiment (taken along line IVA-IVA in FIG. 3), and FIG. 4B is a sectional view of a stator according to a comparative example.

FIG. 9A is a sectional view of the stator according to the modification (taken along line IXA-IXA in FIG. 8), and FIG. 9B is a sectional view of a stator according to a comparative example.

FIG. 10 is a partial bottom view of the stator core according to the modification.

DESCRIPTION OF THE EMBODIMENTS

Figure 1:
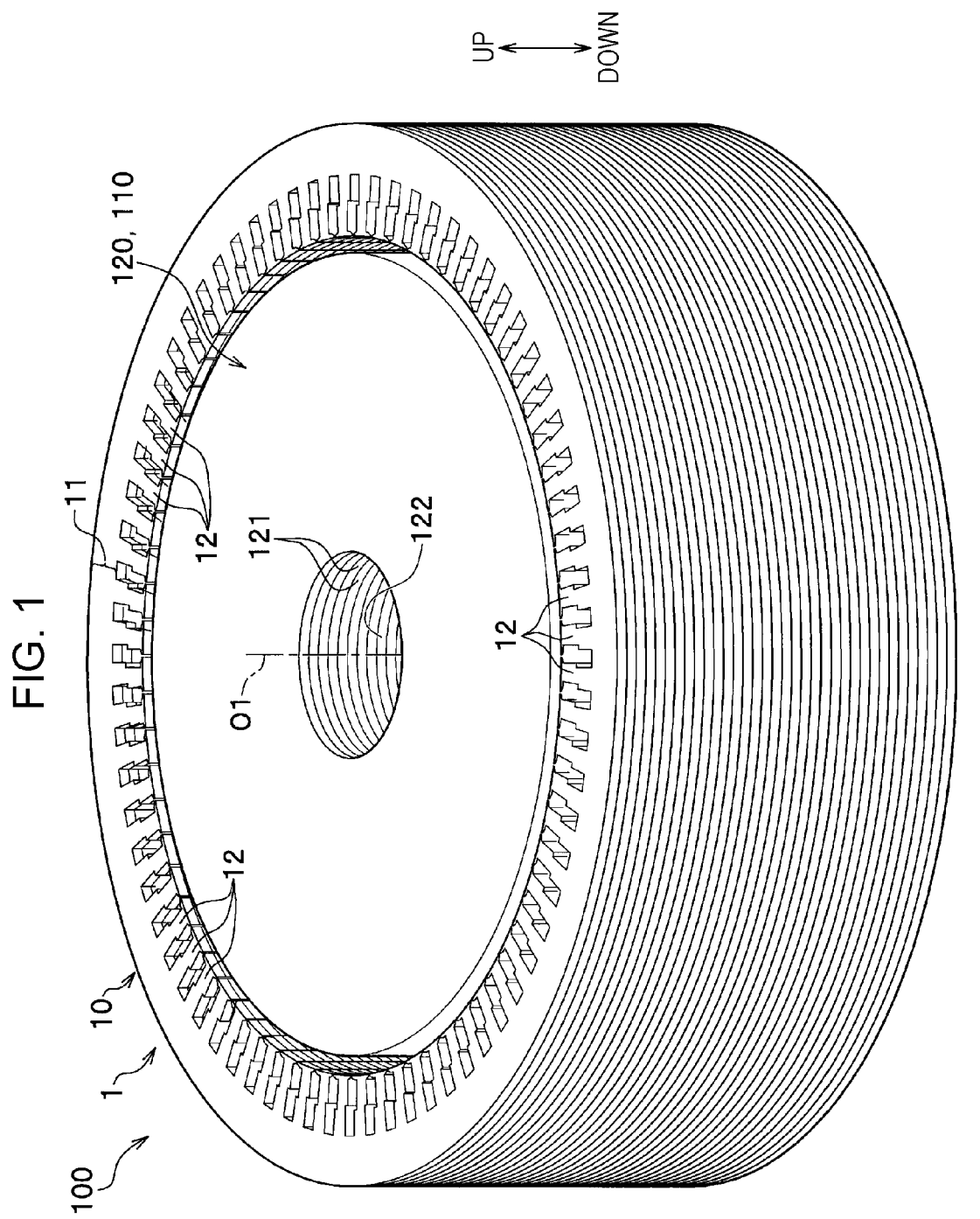
FIG. 1 is a perspective view of a motor according to an embodiment.

The embodiments will now be described with reference to the accompanying drawings, wherein like reference numerals designate corresponding or identical elements throughout the various drawings.

An embodiment of the present disclosure will be described with reference to FIGS. 1 to 7.

Structure of Motor

A motor 100 according to the present embodiment is, for example, a thin motor that is used for a hybrid electric vehicle. In practice, the motor 100 is placed horizontally in a hybrid electric vehicle, that is, in such a way that the axis O1 extends in the left-right direction. However, for convenience of description, the up-down direction is defined as shown by an arrow in FIG. 1. That is, in the following description, the axial direction of the motor 100 is the up-down direction. The motor 100 is reduced in size in the axial direction (up-down direction).

The motor 100 includes a cylindrical rotor 110, which rotates about the axis O1, and a cylindrical stator 1, which is disposed outside of the rotor 110 in the radial direction and coaxial with the rotor 110.

Rotor

The rotor 110 includes a cylindrical rotor core 120 and a plurality of magnets (not shown) embedded in the rotor core 120. The rotor core 120 includes a plurality of thin disk-shaped rotor core plates 121 that are stacked in the axial direction. The plurality of rotor core plates 121 are held in a stacked state by being, for example, swaged. The rotor core 120 has a through-hole 122, into which an output shaft (not shown) is inserted, at the center thereof. The plurality of magnets is disposed outside of the rotor core 120 in the radial direction so as to be arranged at regular intervals in the circumferential direction.

Structure of Stator

The stator 1 generates a magnetic force, for rotating the rotor 110, when a three-phase (U-phase, V-phase, and W-phase) alternating current is supplied from an external inverter (not shown). The stator 1 includes a stator core 10 and a plurality of SCs 31 (segment conductors, coils).

Structure of Stator Core

The stator core 10, which serves as an iron core in which a magnetic path is formed, has a substantially cylindrical shape. The stator core 10 includes a cylindrical base portion 11 and a plurality of teeth 12. The teeth 12 extend inward in the radial direction from an inner periphery of the cylindrical base portion 11 and are arranged at predetermined intervals in the circumferential direction. A slot 18, into which a corresponding one of the SCs 31 is inserted, is formed between each pair of the teeth 12 that are adjacent to each other in the circumferential direction.

Teeth of Stator Core

Figure 3:
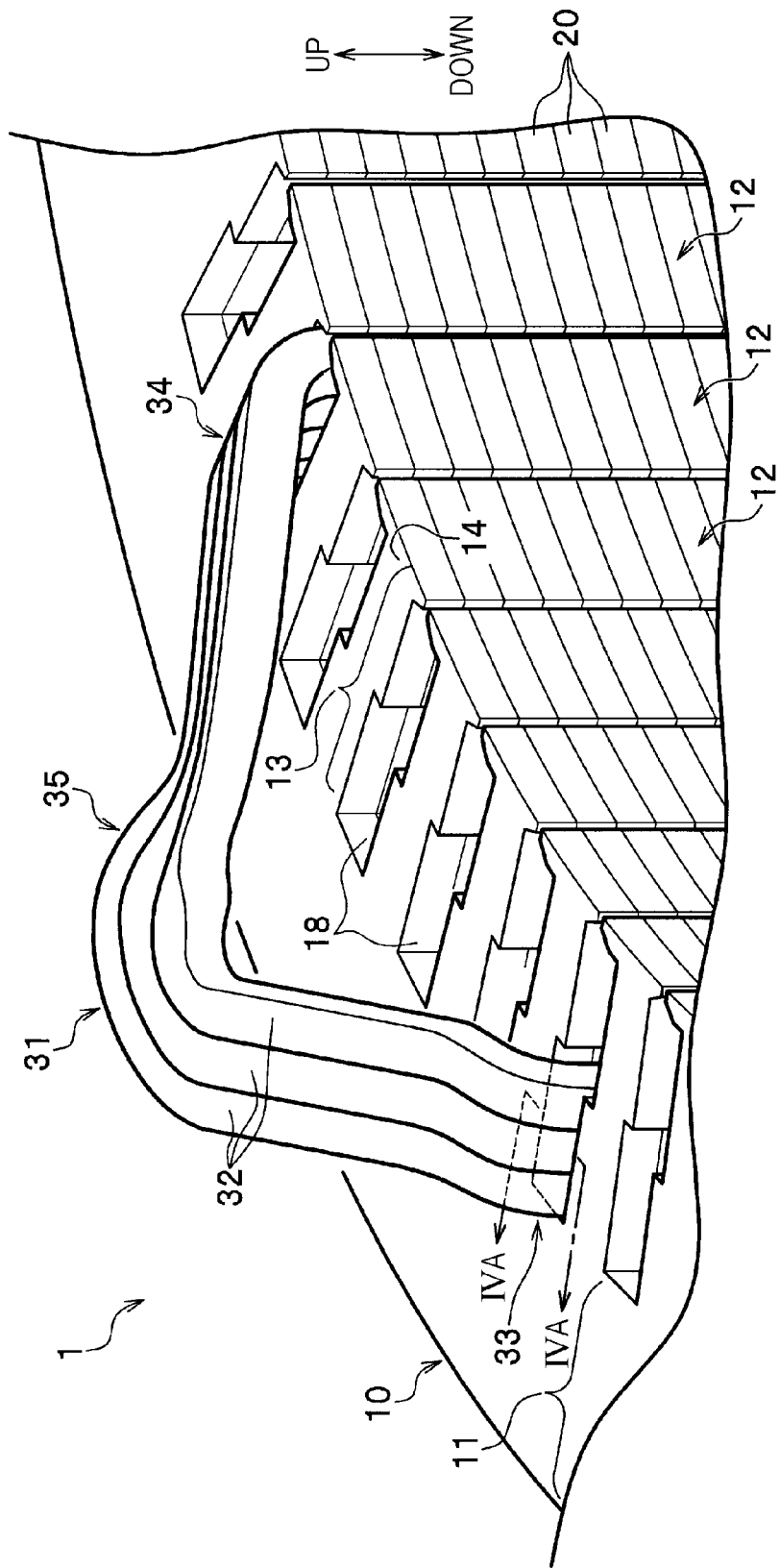
FIG. 3 is a partial perspective view of a stator according to the embodiment.
Figure 5:
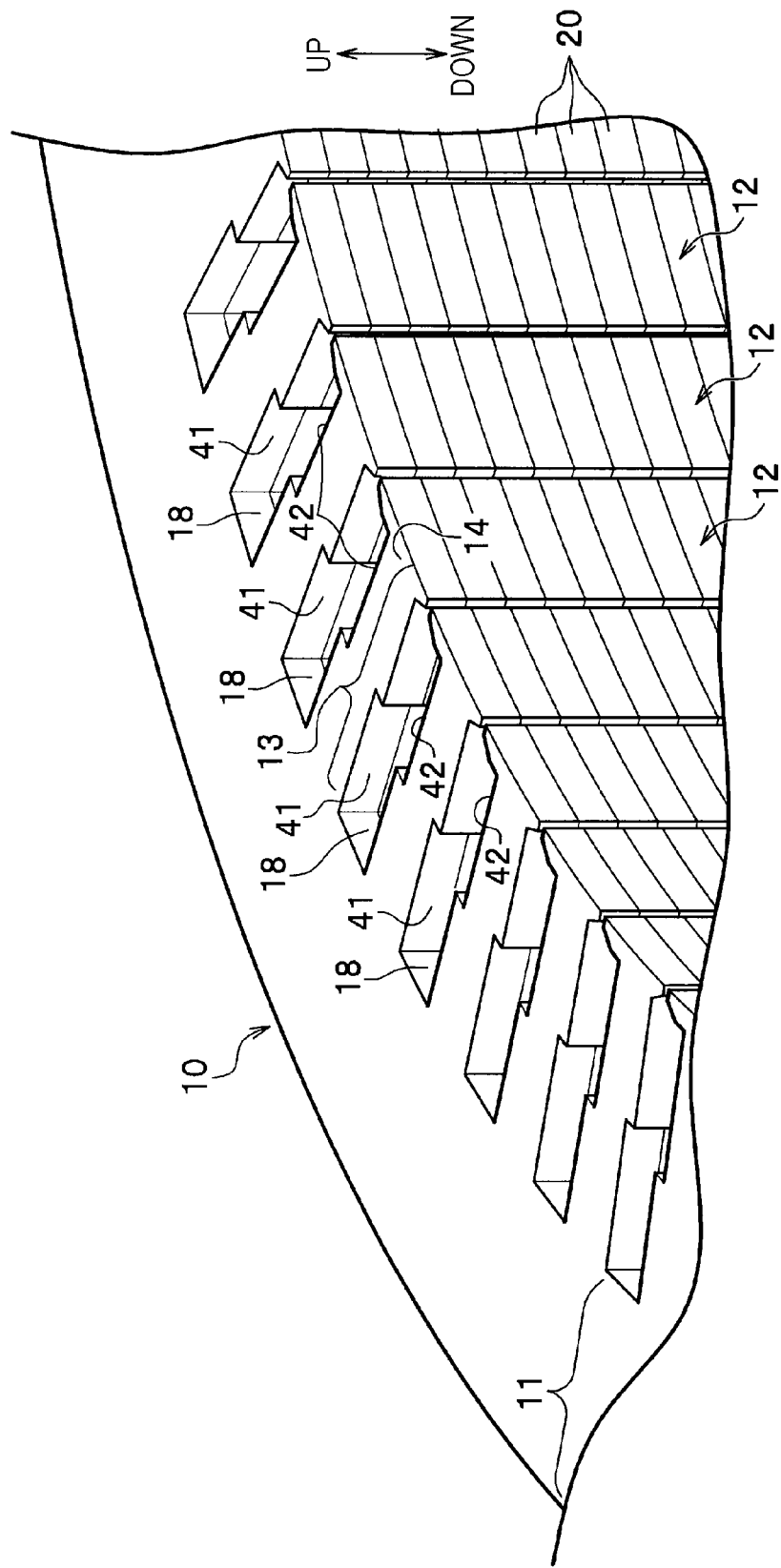
FIG. 5 is a partial perspective view of a stator core according to the embodiment.
Figure 7:
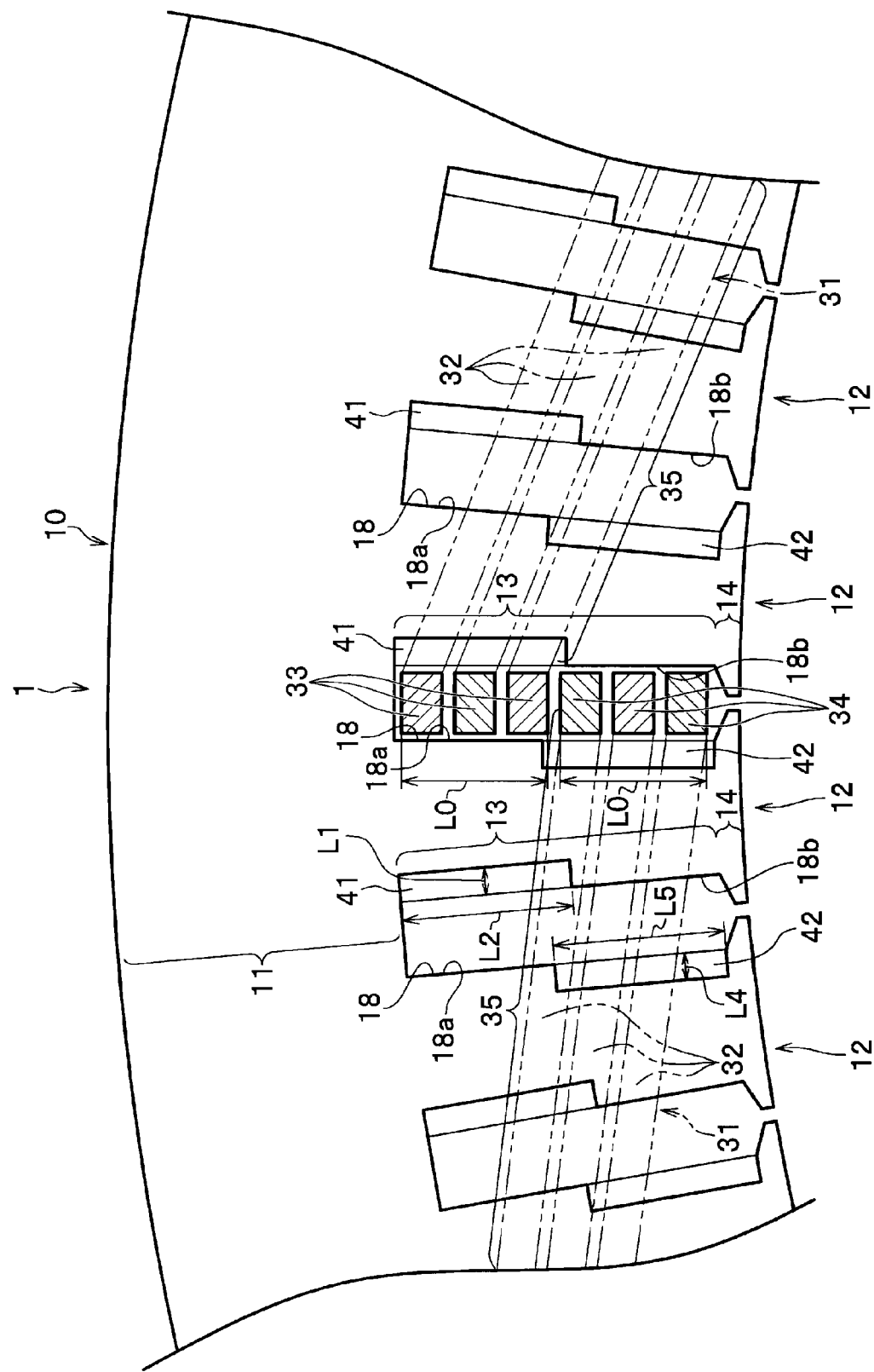
FIG. 7 is a partial plan view of a stator core according to the present embodiment.

Referring to FIGS. 3, 5, and 7, each of the teeth 12 includes a tooth body 13 and a wide portion 14. The tooth body 13 extends from the cylindrical base portion 11 inward in the radial direction with a predetermined width as seen in the axial direction. The wide portion 14 is located at an inner end of the tooth body 13 in the radial direction and has a large width. Because the wide portion 14, which is wider than the tooth body 13, is formed inside of the tooth body 13 in the radial direction, the SC 31 is not removed from the slot 18 inward in the radial direction.

Slots of Stator Core

The slots 18 are through-holes that extend in the axial direction and that are open at upper and lower ends thereof. First insertion portions 33 and second insertion portions 34 of the SCs 31 are inserted into the slots 18. In the present embodiment, when the slots 18 are seen in the axial direction, the radial direction is the longitudinal direction and the circumferential direction is the transversal direction. Referring to FIG. 7, six wires 32 are arranged in each of the slots 18 in the radial direction.

Stator Core Plates of Stator Core

Figure 2:
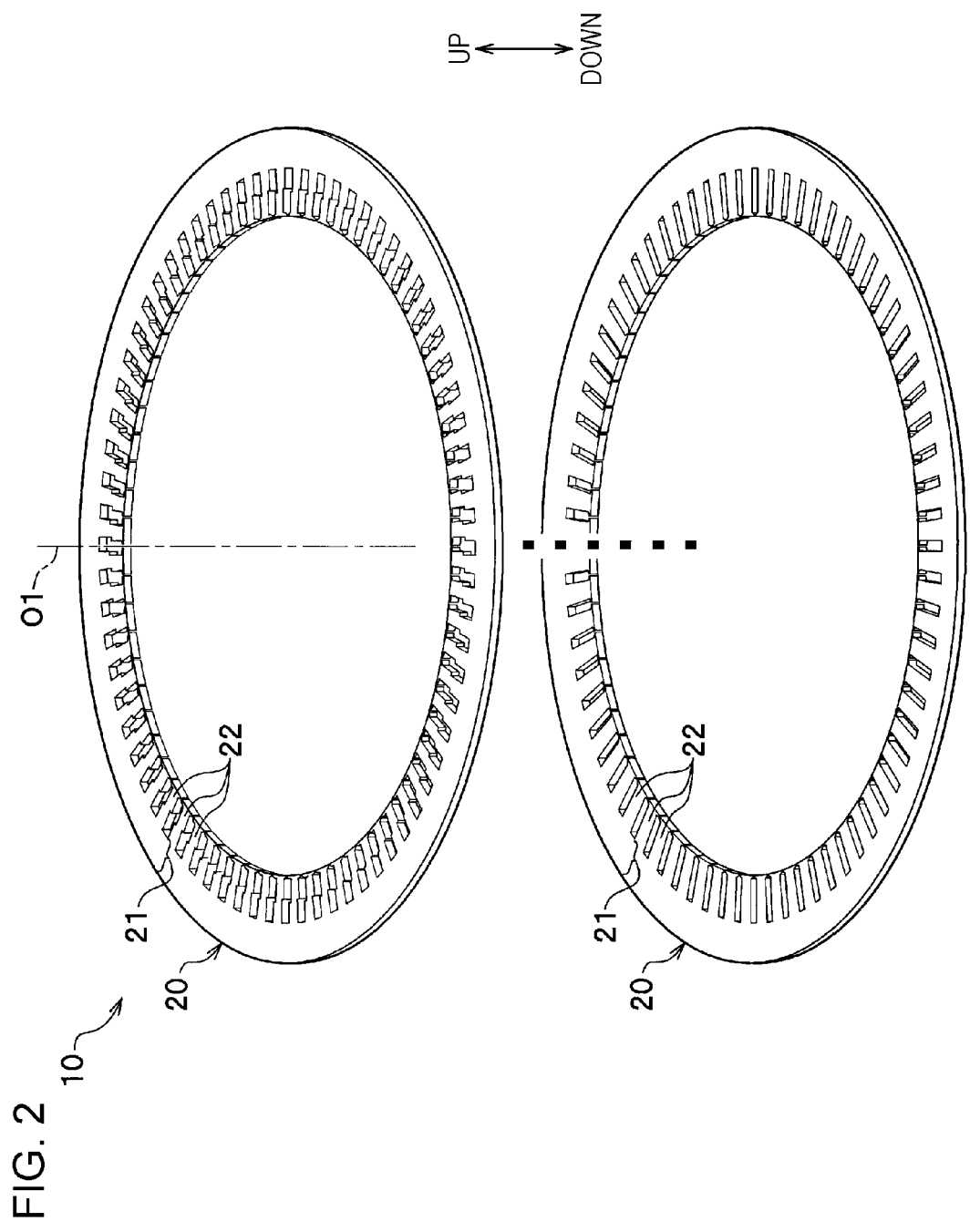
FIG. 2 is a perspective view of stator core plates according to the embodiment.

Referring to FIGS. 2 and 5, the stator core 10 includes a plurality of stator core plates 20, each having a thin annular shape, that are stacked. The plurality of stator core plates 20 are stacked and held together by, for example, being swaged. The stator core plates 20 are made by, for example, punching a magnetic steel sheet, which is made of a magnetic material.

Referring to FIG. 2, each of the stator core plates 20 includes an annular base plate portion 21 and a plurality of tooth plates 22. The tooth plates 22 extend inward from an inner periphery of the base plate portion 21 in the radial direction and are arranged at predetermined intervals in the circumferential direction. The base plate portions 21 form the cylindrical base portion 11 when stacked. The tooth plates 22 form the teeth 12 when stacked.

SC

Figure 6:
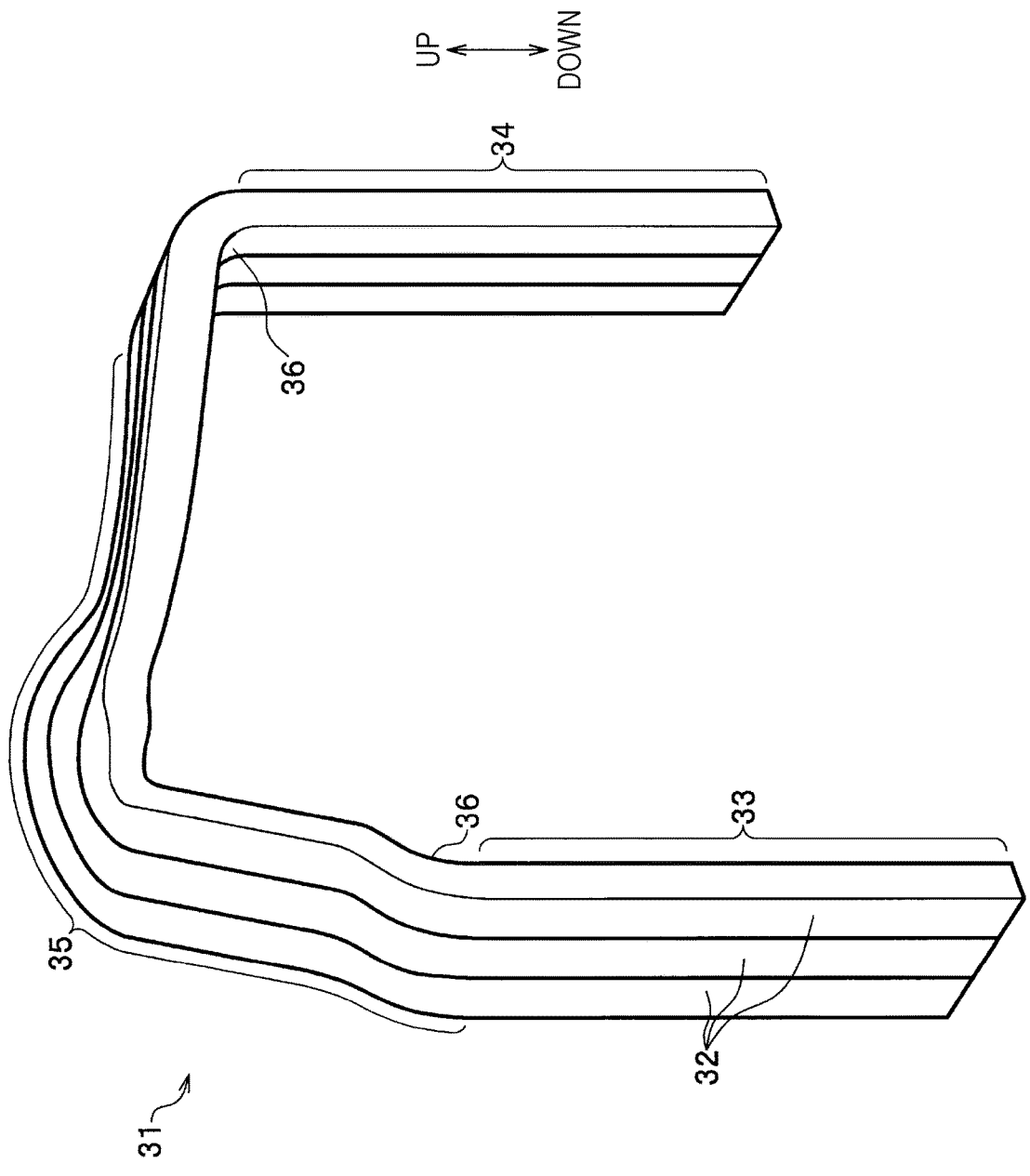
FIG. 6 is a perspective view of a segment conductor (hereinafter, abbreviated as "SC") according to the embodiment.

The SCs 31, through which a three-phase alternating current flows, are each inserted into two slots 18. Referring to FIGS. 3, 6, and 7, each of the SCs 31 includes a plurality of (in the present embodiment, three) metal wires 32 that are joined together by using a binder (not shown). An insulation film (not shown), for electrical insulation, is formed on the surface of the SC 31.

Insulating Paper

To electrically insulate the SCs 31 and the slots 18 from each other, insulation paper (not shown) is inserted into spaces between the SCs 31 and the slots 18 so as to be adjacent to inner wall surfaces of the slots 18. However, insulation paper is not necessary if the insulation film is sufficiently thick and has sufficiently high insulation ability.

Referring to FIG. 6, the SC 31 has a substantially inverted-U-shape whose upper portion in the axial direction is closed. The SC includes the first insertion portion 33 and the second insertion portion 34, which extend in the axial direction, and a curved portion 35. The curved portion 35 connects an upper end portion of the first insertion portion 33 and an upper end portion of the second insertion portion 34 to each other. The curved portion 35 of the SC 31 is located near a coil end.

Referring to FIG. 3, the first insertion portion 33 and the second insertion portion 34 are respectively inserted into two of the slots 18. Referring to FIG. 3, the first insertion portion 33 and the second insertion portion 34 are inserted into the slots 18 that are separated from each other with a plurality of (in the present embodiment, four) slots 18 therebetween, so that the plurality of teeth 12, which are arranged in the circumferential direction, can be appropriately magnetized when a three-phase alternating current is applied.

A lower end of the first insertion portion 33 is electrically connected to a lower end of the second insertion portion 34 of another SC 31. A lower end of the second insertion portion 34 is electrically connected to a lower end of the first insertion portion 33 of another SC 31.

Referring to FIGS. 3 and 7, the first insertion portion 33 is inserted into an outer part of a corresponding one of the slots 18 in the radial direction, and the second insertion portion 34 is inserted into an inner part of a corresponding one of the slots 18 in the radial direction. As seen in the axial direction, the curved portion 35 extends slightly at an angle with respect to the circumferential direction.

Directions in which Curved Portion is Bent

Next, the directions in which the curved portion 35 is bent with respect to the first insertion portion 33 and the second insertion portion 34 will be described. Here, in plan view, the clockwise side around the axis O1 is defined as the front side and the counterclockwise side around the axis O1 is defined as the back side.

With respect to the first insertion portion 33, the curved portion 35 is bent toward the front side. Accordingly, at a bent portion (boundary portion) between the first insertion portion 33 and the curved portion 35, an inner surface of the bent portion is on the front side and an outer surface of the bent portion is on the back side.

With reference to the second insertion portion 34, the curved portion 35 is bent toward the back side. Accordingly, at a bent portion (boundary portion) between the second insertion portion 34 and the curved portion 35, an inner surface of the bent portion is on the back side and an outer surface of the bent portion is on the front side.

Cutouts

First cutouts 41 and second cutouts 42 are formed in parts of the tooth body 13 near an upper end surface (one end surface) of the tooth body 13.

First Cutout

The first cutout 41 is formed in a part of each of the tooth bodies 13 of the teeth 12 that surround the opening at the upper end of the slot 18. The portion is located near the upper end surface of the tooth body 13, in an outer part of the tooth body 13 in the radial direction, and on the back side of the tooth body 13 in the circumferential direction. The first cutout 41 has a predetermined length L1 (width) in the circumferential direction, a predetermined length L2 (width) in the radial direction, and a predetermined length L3 (depth) in the axial direction. The part of the tooth body 13, which is located near the upper end surface of the tooth body 13, in an outer part of the tooth body 13 in the radial direction, and on the back side of the tooth body 13 in the circumferential direction, is a portion that faces the inner surface of the bent portion (boundary portion) between the first insertion portion 33 and the curved portion 35.

The first cutouts 41 are formed by cutting some of the stator core plates 20 located near the upper end surface in the same way. The first cutouts 41 and the second cutouts 42 (described below) respectively have a uniform length (uniform width) in the circumferential direction and a uniform length (uniform width) in the radial direction. Therefore, the stator core plates 20 that are located near the upper end surface and in which the first cutouts 41 are formed have the same shape. Thus, by punching a magnetic steel sheet by using the same die, it is possible to obtain the stator core plates 20 that are located near the upper end surface and in which the first cutouts 41 are formed. Accordingly, the stator core according to the embodiment can be manufactured more efficiently than in a case where cutouts having different shapes are formed in stator core plates 20 by using a plurality of dies. (Such a case is described, for example, in Japanese Unexamined Patent Application Publication No. 2010-130842, the entire contents of are incorporated herein by reference.)

Because the first cutout 41 is formed in a part of the tooth body 13 facing the inner surface of the bent portion between the first insertion portion 33 and the curved portion 35, the curved portion 35 is not likely to interfere with the tooth body 13 and the first insertion portion 33 is inserted into the slot 18 by a large amount. Thus, the protruding amount T1 of the curved portion 35, by which the curved portion 35 protrudes upward from the stator core 10, is smaller than the protruding amount T2 of the curved portion 35 in a case where the first cutout 41 is not formed (T1<T2, see FIGS. 4A and 4B). Accordingly, the stator 1 is reduced in size in the axial direction.

The length L2 of the first cutout 41 in the radial direction is greater than the length L0 (coil width) of the SC 31 in the radial direction. Thus, the curved portion 35 can be contained in the first cutout 41 even if the direction in which the curved portion 35 is bent with respect to the first insertion portions 33 varies in the radial direction. The same applies to the predetermined length L5 of the second cutout 42 in the radial direction.

An inner surface 36 of the bent portion between the first insertion portion 33 and the curved portion 35 is not likely to contact the tooth body 13, and a gap is formed between the inner surface 36 of the bent portion and the tooth body 13. Thus, the insulation film (not shown) on the inner surface 36 of the bent portion can be effectively protected.

Second Cutout

The second cutout 42 is formed in a part of each of the tooth bodies 13 of the teeth 12 that surround the opening at the upper end of the slot 18. The portion is located near the upper end surface of the tooth body 13, in an inner part of the tooth body 13 in the radial direction, and on the front side of the tooth body 13 in the circumferential direction. The second cutout 42 has a predetermined length L4 in the circumferential direction, a predetermined length L5 in the radial direction, and a predetermined length in the axial direction. The part of the tooth body 13, which is located near the upper end surface of the tooth body 13, in an inner part of the tooth body 13 in the radial direction, and on the front side of the tooth body 13 in the circumferential direction, is a portion that faces the inner surface of the bent portion (boundary portion) between the second insertion portion 34 and the curved portion 35. The second cutouts 42 are formed by cutting some of the stator core plates 20 located near the upper end surface in the same way.

Because the second cutout 42 is formed in a part of the tooth body 13 facing the inner surface of the bent portion between the second insertion portion 34 and the curved portion 35, the curved portion 35 is not likely to interfere with the tooth body 13 and the second insertion portion 34 is inserted into the slot 18 by a large amount. Thus, the protruding amount of the curved portion 35, by which the curved portion 35 protrudes upward from the stator core 10, is smaller than the protruding amount of the curved portion 35 in a case where the second cutout is not formed. Accordingly, the stator 1 is reduced in size the axial direction.

A cutout is not formed in a part of the tooth body 13 near the upper end surface surrounding the opening of the slot 18, the portion facing the outer surface of the bent portion of the SC 31. That is, a cutout is not formed in either of a part of the tooth body 13 that is located in an outer part in the radial direction and on the front side in the circumferential direction and in a part of the tooth body 13 that is located in an inner part in the radial direction and on the back side in the circumferential direction. Facing surfaces 18a and 18b, which face the outer surfaces of the bent portions of the SCs 31, extend in the axial direction (up-down direction). Because the outer surface of the bent portion of the SC 31 does not interfere with the curved portion 35, the outer surface does not affect the insertion amount by which the first insertion portion 33 and the second insertion portion 34 are inserted into the slot 18. Moreover, because the cutout is not formed, an iron core, that is, a magnetic path is appropriately provided.

Advantageous Effects of Stator and Stator Core

The stator 1 and the stator core 10 provide the following advantages. The first cutout 41 is formed so as to face the inner surface of the bent portion between the first insertion portion 33 and the curved portion 35, and the second cutout 42 is formed so as to face the inner surface of the bent portion between the second insertion portion 34 and the curved portion 35. Therefore, the protruding amount T1, by which the curved portion 35 protrudes from the upper end surface of the stator core 10, is reduced. Thus, the stator 1 and the motor 100 are reduced in size in the axial direction.

The stator 1 can be easily obtained by only bending the SCs 31 by using a bending machine and inserting the SCs 31 into the slots 18. That is, it is not necessary to perform a process of, for example, pressing the SCs 31 tightly against the stator core 10.

Modifications

Figure 8:
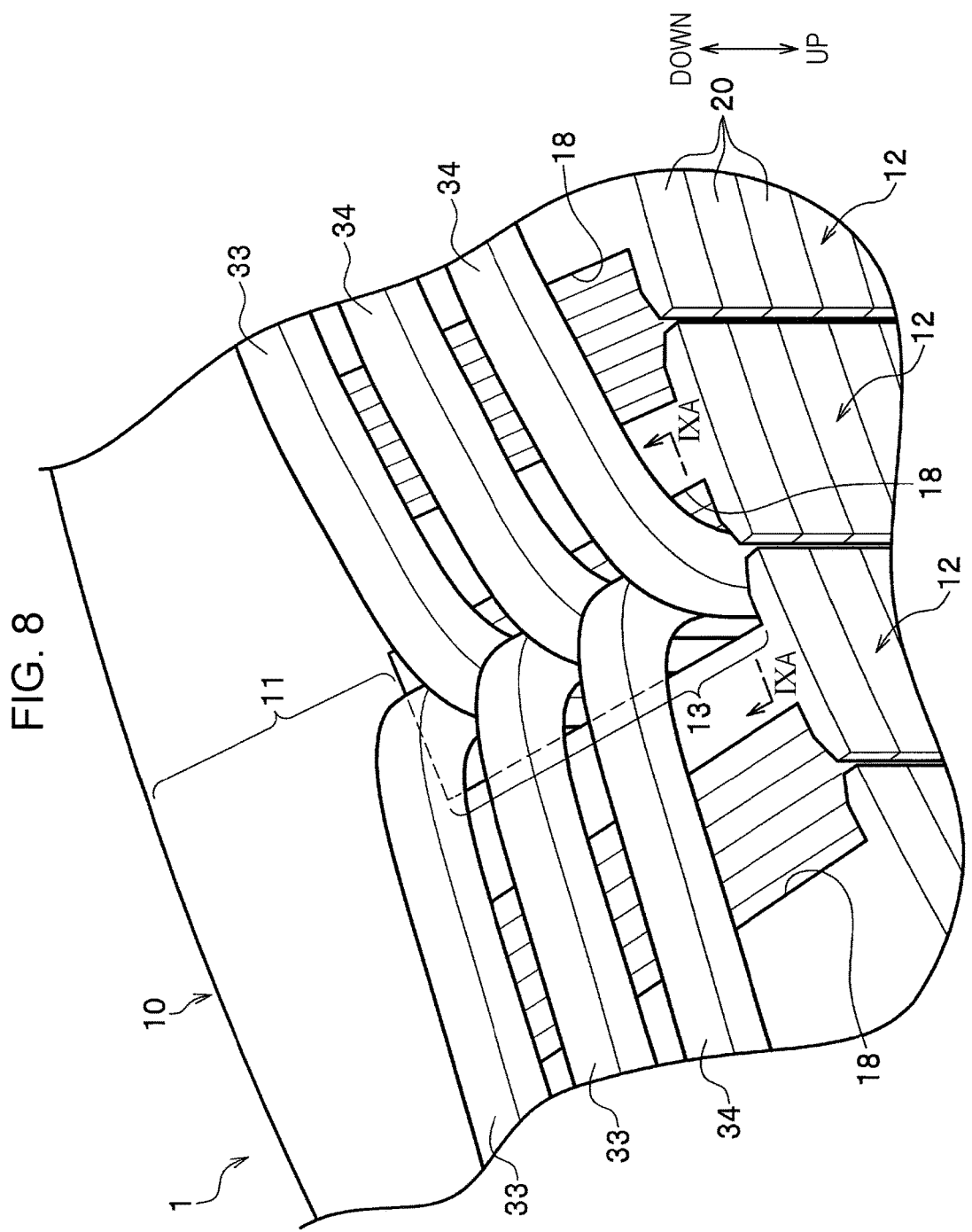
FIG. 8 is a partial perspective view of a stator according to a modification.

The present disclosure is not limited to the embodiment described above, which may be modified, for example, as follows FIGS. 8 to 10 illustrate a modification. In FIGS. 8 to 10, a lower end surface (one end surface) of the stator 1 is shown. Referring to FIGS. 8 and 9A, at a lower end of the first insertion portion 33, lower end portions 37 of the wires 32 of the first insertion portion 33 are alternately bent in the circumferential direction. That is, both of the front side and the back side of the tooth body 13 correspond to the inner surface of the bent portion of the SC 31. Third cutouts 43 are formed in parts of the tooth body 13 that are near the lower end surface and that are on both sides of the slot 18 in the circumferential direction.

Therefore, a bend point 37a of the lower end portion 37 is located closer to the stator core 10 in the axial direction, and the protruding amount by which the lower end portion 37 protrudes downward from the lower end surface of the stator core 10 is reduced. Thus, the stator 1 is reduced in size in the axial direction.

In the embodiment described above, the stator core 10 includes the plurality of stator core plates 20 that are stacked. Alternatively, the stator core 10 may be an integrated core that is made by, for example, casting.

In the embodiment described above, the stator core 10 is used for the motor 100 (electric motor). Alternatively, for example, the stator core 10 may be used for a generator (electric power generator).

According to one aspect of the present invention, a stator core includes a cylindrical base portion; and a plurality of teeth that extend inward in a radial direction from the cylindrical base portion and that are arranged at predetermined intervals in a circumferential direction. A slot, into which a coil is inserted, is formed between each pair of the teeth that are adjacent to each other in the circumferential direction. A cutout is formed in a part of each of the teeth near one end surface of the tooth, the part facing an inner surface of a bent portion of the coil, the cutout having a predetermined length in the circumferential direction, a predetermined length in the radial direction, and a predetermined length in an axial direction.

With such a structure, a cutout is formed in a part of each of the teeth near one end surface of the tooth, the part facing an inner surface of a bent portion of the coil, the cutout having a predetermined length in the circumferential direction, a predetermined length in the radial direction, and a predetermined length in an axial direction. Therefore, the inner surface of the bent portion of the coil is not likely to interfere with the tooth and the bend point is moved inward in the axial direction of the stator core. Thus, the protruding amount of the coil, by which a curved portion of the coil protrudes from the one end surface of the stator core outward in the axial direction, is reduced. Accordingly, the stator is reduced in size in the axial direction. Moreover, the cutout can be easily formed, because the cutout has a predetermined length in the circumferential direction, a predetermined length in the radial direction, and a predetermined length in the axial direction.

Preferably, a gap is formed between the inner surface of the bent portion of the coil and the tooth, and the inner surface of the bent portion of the coil does not contact the tooth.

With such a structure, the gap is formed between the inner surface of the bent portion of the coil, and the inner surface of the bent portion of the coil does not contact the tooth. Therefore, an insulation film that is formed on the surface of the coil can be appropriately protected. Thus, the coil and the tooth can be electrically insulated from each other appropriately.

Preferably, the length of the cutout in the radial direction is greater than a length of the coil in the radial direction.

With such a structure, the bent portion of the coil can be appropriately contained in the cutout even if the bent portion of the coil varies in the radial direction, because the length of the cutout in the radial direction is greater than the length of the coil in the radial direction.

Preferably, the stator core includes a plurality of stator core plates that are stacked, and the cutout is formed by cutting some of the stator core plates that are located near the one end surface.

With such a structure, the stator core can be easily obtained by stacking the plurality of stator core plates.

Preferably, a cutout is not formed in a part of each of the teeth near one end surface of the tooth, the part facing an outer surface of the bent portion of the coil, and a facing surface of the tooth, the facing surface facing the outer surface of the bent portion of the coil, extends in the axial direction.

With such a structure, the cutout is not formed in a part of each of the teeth near one end surface of the tooth, the part facing the outer surface of the bent portion of the coil, and the facing surface of the tooth, the facing surface facing the outer surface of the bent portion of the coil, extends in the axial direction. Therefore, a magnetic path can be appropriately formed.

Preferably, the cutout is formed in each of the pair of the teeth that are located adjacent to each other with the slot therebetween in the circumferential direction.

With the present disclosure, it is possible to provide a stator core that can be reduced in size in the axial direction with a simple structure.

Obviously, numerous modifications and variations of the present invention are possible in light of the above teachings. It is therefore to be understood that within the scope of the appended claims, the invention may be practiced otherwise than as specifically described herein.

What is claimed is:

1. A stator core comprising:
a cylindrical base portion having a center axis; and
a plurality of teeth that extend inward in a radial direction with respect to the center axis from the cylindrical base portion and that are arranged at predetermined intervals in a circumferential direction around the center axis, the cylindrical base portion and the plurality of teeth having a first end surface and a second end surface opposite to the first end surface in an axial direction along the center axis,
wherein a slot, into which a coil is inserted, is formed between a first tooth and a second tooth among the plurality of teeth, the first tooth and the second tooth being adjacent to each other in the circumferential direction,
wherein a cutout is formed at a first part of the first tooth, the first part being provided on the first end surface, the first part facing an inner surface of a bent portion of the coil,
wherein the cutout does not extend to the second end surface of the first tooth, and
wherein an additional cutout is not formed at a second part of the second tooth, the second part being provided on the first surface of the second tooth and facing the first part in the circumferential direction.

2. The stator core according to claim 1,
wherein a gap is formed between the inner surface of the bent portion of the coil and the tooth, and the inner surface of the bent portion of the coil does not contact the tooth.

3. The stator core according to claim 1,
wherein the length of the cutout in the radial direction is greater than a length of the coil in the radial direction.

4. The stator core according to claim 1,
wherein the stator core includes a plurality of stator core plates that are stacked, and
wherein the cutout is formed by cutting some of the stator core plates that are located near the one end surface.

5. The stator core according to claim 1,
wherein the coil is inserted into the slot such that the second part of the second tooth faces an outer surface of the bent portion of the coil, and
wherein a second facing surface of the tooth, the second facing surface facing the outer surface of the bent portion of the coil, extends in the axial direction.

6. The stator core according to claim 1,
wherein the cutout is not formed at a third part of the first tooth, the third part being provided on the first end surface of the first tooth and adjoining the first part in the radial direction,
wherein the additional cutout is formed at a fourth part of the second tooth, the fourth part being provided on the first end surface of the second tooth and adjoining the second part in the radial direction, the fourth part facing an additional inner surface of an additional bent portion of the coil, the third part facing the fourth part in the circumferential direction, wherein each of the cutout and the additional cutout has a rectangular shape viewed in the axial direction, and wherein the first part partially faces the fourth part in the circumferential direction.

7. A stator core of a rotating electric machine, comprising:

a base including a through-hole having a substantially cylindrical shape surrounded by an inner circumferential wall around a center axis of the substantially cylindrical shape;

teeth arranged around the center axis and extending along a radial direction of the substantially cylindrical shape from the inner circumferential wall toward the center axis, each of the teeth having a first end surface and a second end surface opposite to the first end surface along the center axis;

slots each defined between a tooth and another tooth adjacent to the tooth among the teeth such that a coil is to be provided into each of the slots; and cutouts each provided in the first end surface to face an inner surface of a bent portion of the coil, the cutouts including a first cutout provided at a first part of the tooth, the first part being provided on the first end surface of the tooth, wherein the first cutout does not extend to the second end surface of the tooth, and wherein an additional cutout of the cutouts is not formed at a second part of the additional tooth, the second part being provided on the first surface of the additional tooth and facing the first part in the circumferential direction.

8. The stator core according to claim 7, wherein the base has a cylindrical shape.

9. The stator core according to claim 8, wherein each of the cutouts has a predetermined length in a circumferential direction of the cylindrical shape of the base, a predetermined length in the radial direction, and a predetermined length in an axial direction of the center axis.

10. The stator core according to claim 7, wherein a gap is formed between the inner surface of the bent portion of the coil and the tooth, and the inner surface of the bent portion of the coil does not contact the tooth.

11. The stator core according to claim 7, wherein the length of the cutouts in the radial direction is greater than a length of the coil in the radial direction.

12. The stator core according to claim 7, wherein the stator core includes a plurality of stator core plates that are stacked, and wherein the cutouts are formed by cutting some of the stator core plates that are located near the first end surface.

13. The stator core according to claim 9, wherein the coil is inserted into the slots such that the second part of the additional tooth faces an outer surface of the bent portion of the coil, and wherein a second facing surface of the another tooth, the second facing surface facing the outer surface of the bent portion of the coil, extends in the axial direction.

14. The stator core according to claim 9, wherein the first cutout is not formed at a third part of the tooth, the third part being provided on the first end surface of the tooth and adjoining the first part in the radial direction, wherein the additional cutout is formed at a fourth part of the additional tooth, the fourth part being provided on the first end surface of the additional tooth and adjoining the second part in the radial direction, the fourth part facing an additional inner surface of an additional bent portion of the coil, the third part facing the fourth part in the circumferential direction, wherein each of the cutout and the additional cutout has a rectangular shape viewed in the axial direction, and wherein the first part partially faces the fourth part in the circumferential direction.

* * * * *